Figures 1, 1A:
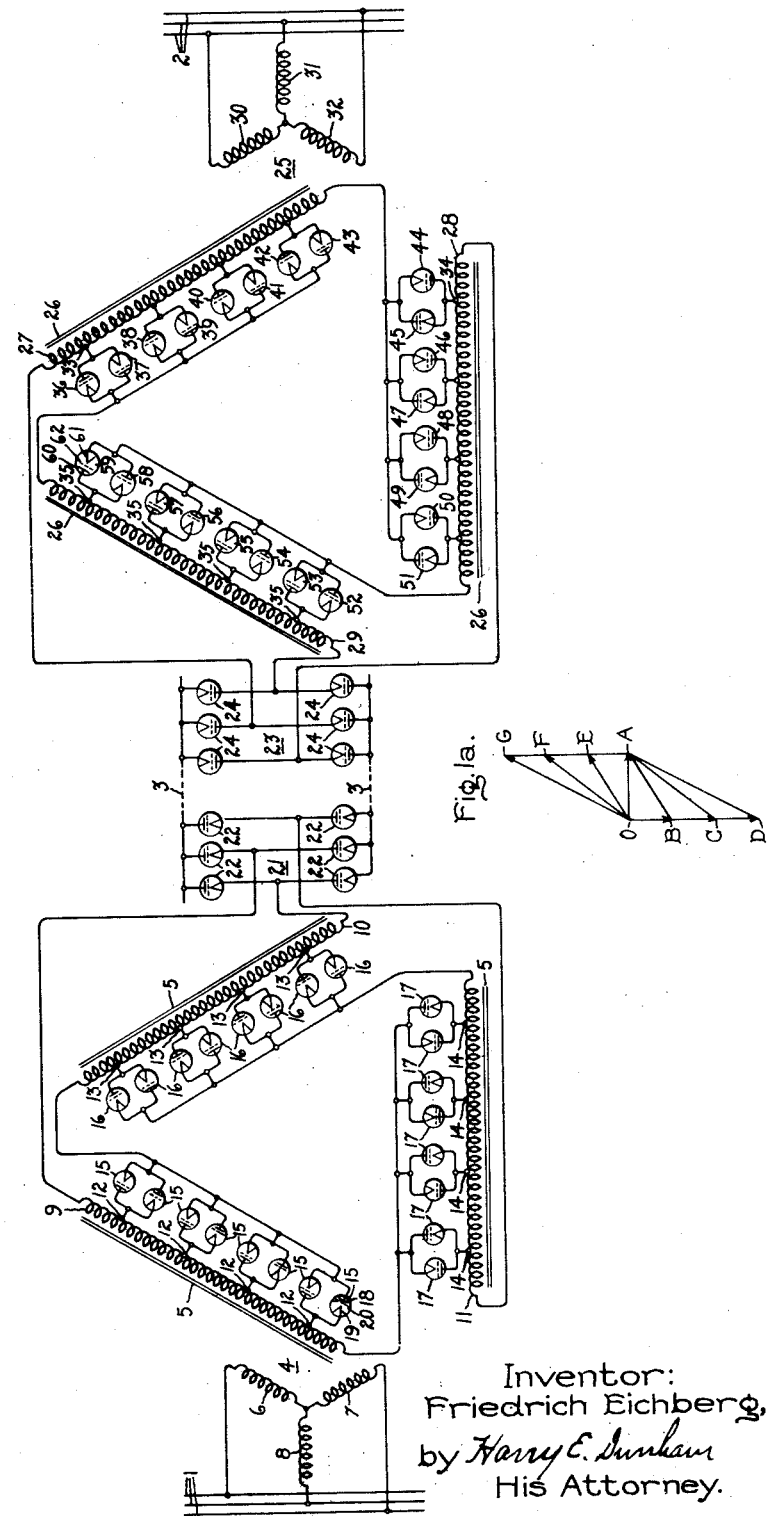

Dec. 10, 1940.     F. EICHBERG     2,224,645
ELECTRIC POWER TRANSMISSION SYSTEM
Filed Nov. 8, 1938     8 Sheets-Sheet 1

Inventor:
Friedrich Eichberg,
by Harry E. Dunham
His Attorney.

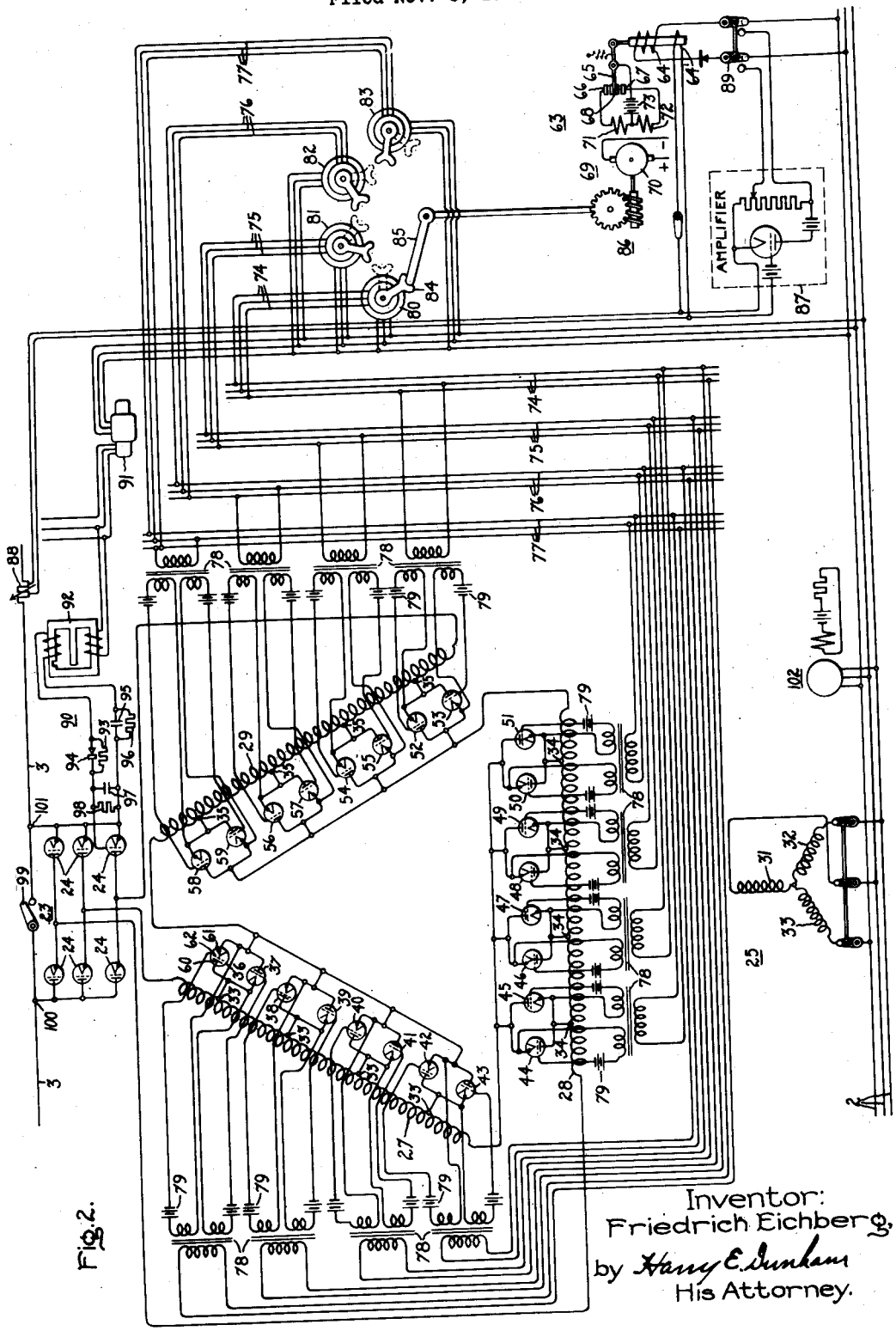

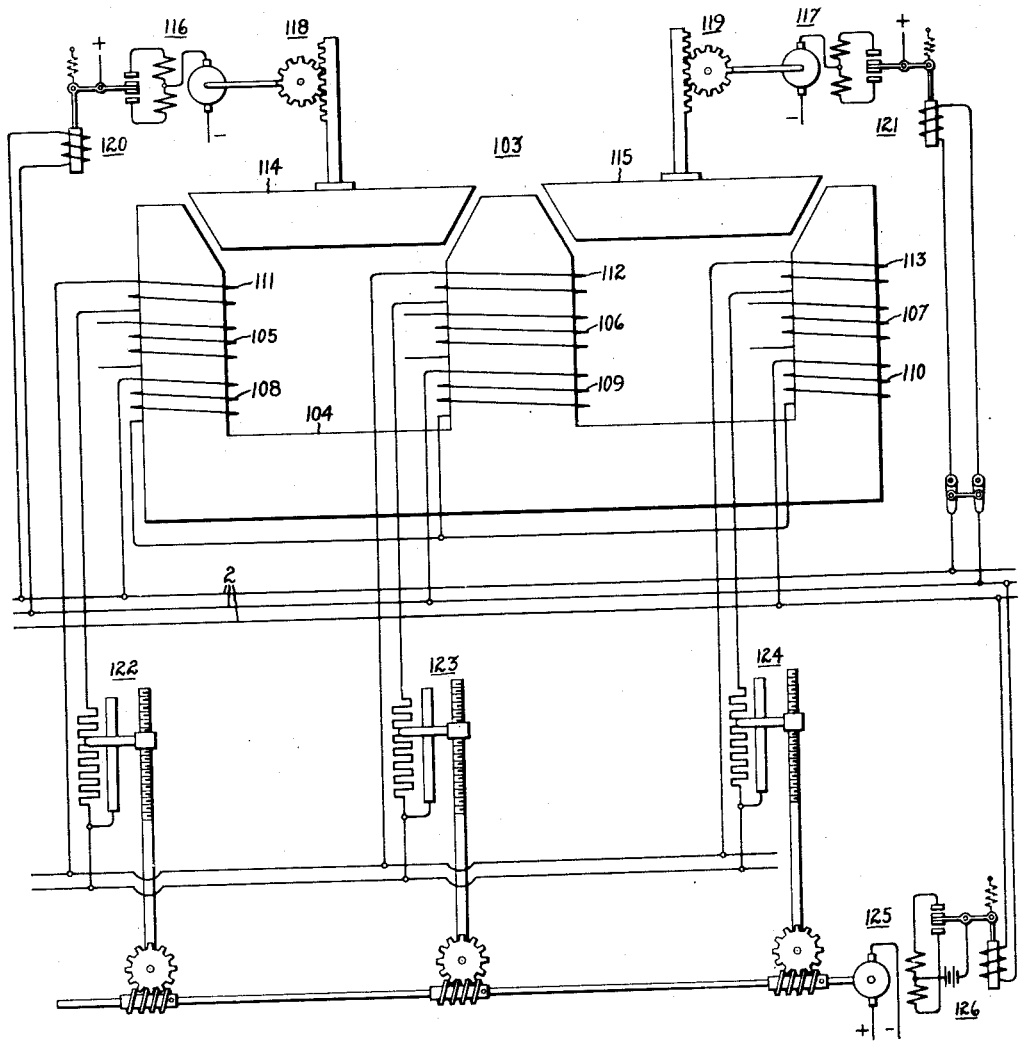

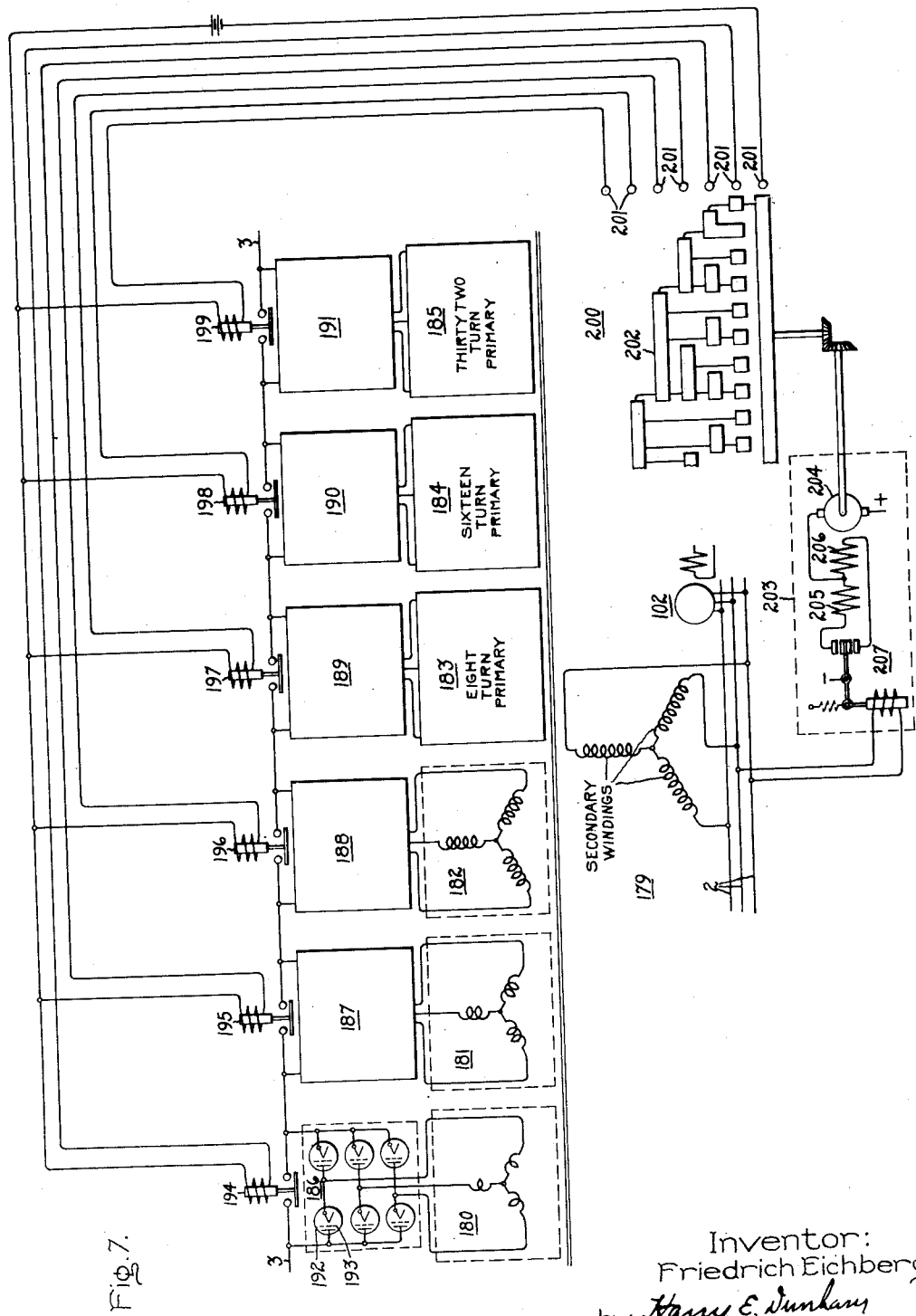

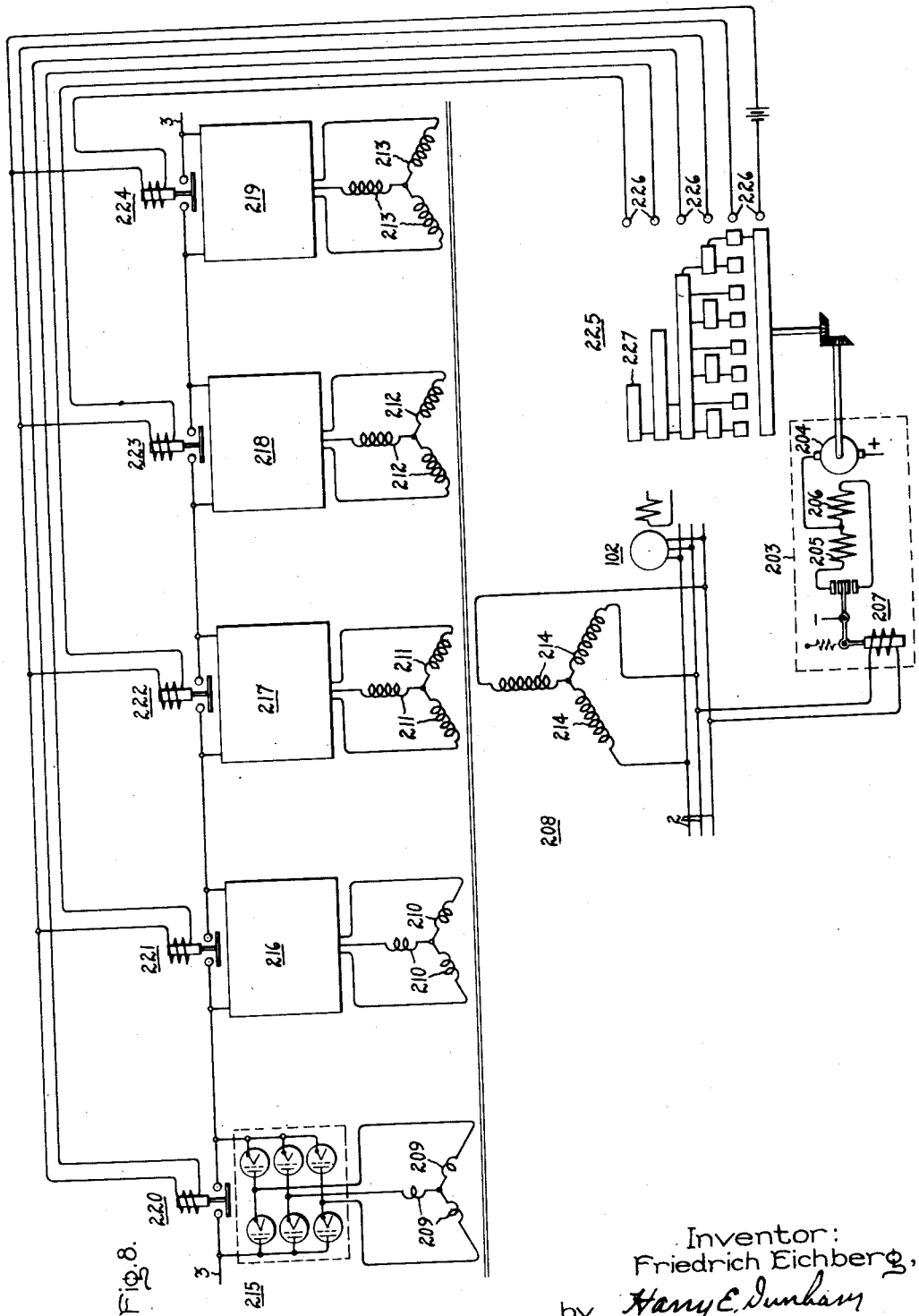

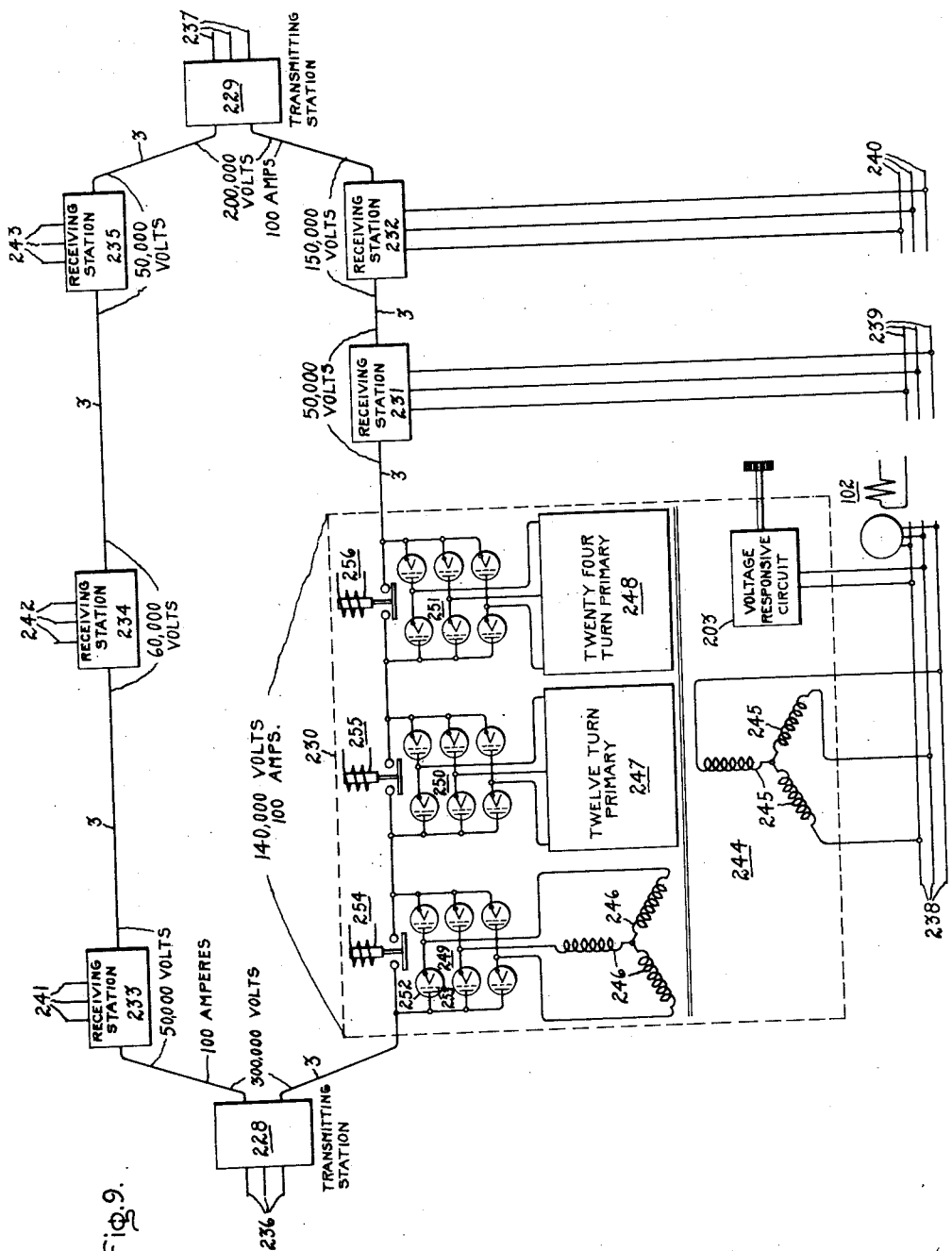

Patented Dec. 10, 1940

2,224,645

UNITED STATES PATENT OFFICE 2,224,645

ELECTRIC POWER TRANSMISSION SYSTEM

Friedrich Eichberg, Keedysville, Md., assignor to General Electric Company, a corporation of New York Application November 8, 1938, Serial No. 239,531
In Germany April 14, 1938

62 Claims. (Cl. 175—363)

My invention relates to electric power transmission systems and more particularly to electric transmission systems in which power is transmitted by means of high voltage direct current. My invention also relates to certain improvements in electric power transmission systems of the nature of those described and claimed in copending patent applications of Frank R. Elder, Serial No. 239,061, and E. F. W. Alexanderson, Serial No. 239,159, both filed November 5, 1938.

The transmission of electric power by means of high voltage direct current offers certain basic advantages over the conventional alternating current systems. Many of these advantages are well known and have been described in numerous engineering and technical publications. Some of these advantages include simplicity in line equipment, economy in copper, relatively simple insulation conditions, reduction in power losses, absence of major inductive and capacitive reactance phenomena, and non-existence of the stability problem. Heretofore, it has been proposed to use electric valve apparatus in direct current power transmission systems because of the facility with which electric valve apparatus and the associated systems may be manipulated. However, the prior art arrangements have not afforded the desired flexibility of control where it is desired to transmit power over wide ranges of load requirements. Furthermore, the prior art arrangements of this nature have involved the use of considerable auxiliary or supplementary equipment in order to obtain the desired flexibility of control and continuity of service which is so important in modern electric power systems. In accordance with the teachings of my invention described hereinafter, I provide new and improved direct current electric power transmission systems which are simple in construction and arrangement and which are readily adaptable to transmission and distribution applications.

It is an object of my invention to provide new and improved electric power transmission systems.

It is another object of my invention to provide new and improved electric power transmission systems in which power is transmitted by means of high voltage direct current.

It is a further object of my invention to provide new and improved electric power transmission systems in which power is transmitted over a direct current transmission line and in which the current level at which power is transmitted may be varied or controlled.

It is a still further object of my invention to provide new and improved electric valve transmitting systems for transmitting power between constant voltage alternating current circuits and constant current direct current circuits.

It is a still further object of my invention to provide new and improved electric power systems for transmitting power between constant voltage alternating current circuits and a variable current-level direct current circuit.

In accordance with the illustrated embodiments of my invention, I provide new and improved electric power transmission systems for transmitting power by means of high voltage direct current. The systems are applicable to arrangements where it is desired to transmit power between constant voltage alternating current circuits and a direct current circuit, or between constant voltage alternating current circuits through apparatus comprising as a link a high voltage direct current circuit. The current transmitted over the direct current circuit of the system may be maintained at a substantially constant value and the value of this current may be adjusted in response to or in accordance with the load requirements of the system in order to reduce losses which would be present if only one value of unidirectional current could be transmitted over the direct current circuit. The direct current circuit may be described as a variable current-level circuit since the value of the direct current which is maintained in the circuit may be controlled or adjusted.

In accordance with one of the illustrated embodiments of my invention, I provide translating apparatus for transmitting power between a constant current direct current circuit, or a variable level, constant current direct current circuit and a constant voltage alternating current circuit through apparatus comprising electric valve means which transform constant current direct current into alternating current of constant value and through a transformer which is connected between the electric valve converting apparatus and the constant voltage circuit. The transformer windings are provided with a plurality of line terminals or taps each of which is provided with individual electric valve means which control the operative portions of the windings to maintain substantially constant the magnetic field of the transformer in order to transmit power to or receive power from the constant voltage alternating current circuit. The system is capable of transmitting power in either direction. The tap-changing electric valve means are controlled by circuits which selectively connect various terminals of the windings to the electric valve converting apparatus in accordance with a predetermined controlling influence such as the voltage of the alternating current circuit. Furthermore, the conductivities of the electric valve means are controlled by the control circuits to effect a more precise control of the magnetic field of the transformer within the steps of control provided by the transition from one transformer terminal to another.

In accordance with another illustrated embodiment of my invention, I provide a new and improved electric translating apparatus for transmitting power in either direction between a constant voltage alternating current circuit and a constant current or variable current-level direct current circuit. The translating apparatus comprises a transformer having a plurality of windings each of which is provided with a plurality of terminals. Electric valve tap-changing apparatus is associated with the terminals to control the operative portions of the transformer windings and hence control the magnetic field of the transformer to effect transfer of power between the constant voltage alternating current circuit and the constant current direct current circuit. The tap-changing electric valves also function as inverters or rectifiers in addition to performing the tap-changing function. The conductivities of the electric valve means are controlled in order to effect transfer of current between the various taps or terminals of the different windings.

In accordance with another feature of the illustrated embodiments of my invention, I provide means for controlling the reluctance of the core member of a transformer which comprises an arrangement for transmitting power between a constant voltage alternating current circuit and a constant current alternating current circuit. A modification of this arrangement comprises a transformer in which a control winding controls the amount of flux linking the secondary winding of the transformer. A variable impedance means is connected across the terminals of the control winding and in this manner the current transmitted by the control winding is effective to maintain the flux linking the secondary winding at a substantially constant value.

In accordance with a still further modification of my invention, I provide improved translating apparatus for transmitting power between a constant voltage alternating current circuit and a constant current direct current circuit, and which comprises a transformer having a plurality of primary windings and a secondary winding. The secondary winding is connected to the constant voltage alternating current circuit and the primary windings, which are of different numbers of turns, are energized from the constant current direct current circuit through a plurality of electric circuits each of which comprises electric valve means for transforming direct current of constant value into alternating current of constant value. I provide means for selectively controlling the direct current terminals of the electric valve means to control gradually the resultant magnetic field of the transformer to effect control of an electrical condition, such as the voltage, of the alternating current circuit under varying load conditions. Means, such as switches, are provided to shunt the direct current terminals of the electric valve converting means to effect selective energization of the various primary windings.

In accordance with a still further embodiment of my invention, I provide new and improved electric translating apparatus for transmitting power between constant current or variable current-level direct current circuits and constant voltage alternating current circuits. The translating apparatus comprises a transformer having a plurality of primary windings, which are arranged to have different numbers of turns. For example, the numbers of turns may be arranged in a geometrical progression to effect smooth and precise control of an electrical condition of the system, such as the voltage of the alternating current circuit. The primary windings are energized through electric valve converting apparatus which transforms direct current into alternating current and which controls the resultant magnetic field of the transformer. Another modification of this aspect of my invention relates to an arrangement in which the number of turns of the primary windings are chosen to reduce the voltage applied to the electric valves in the electric valve converting apparatus.

Figure 4:
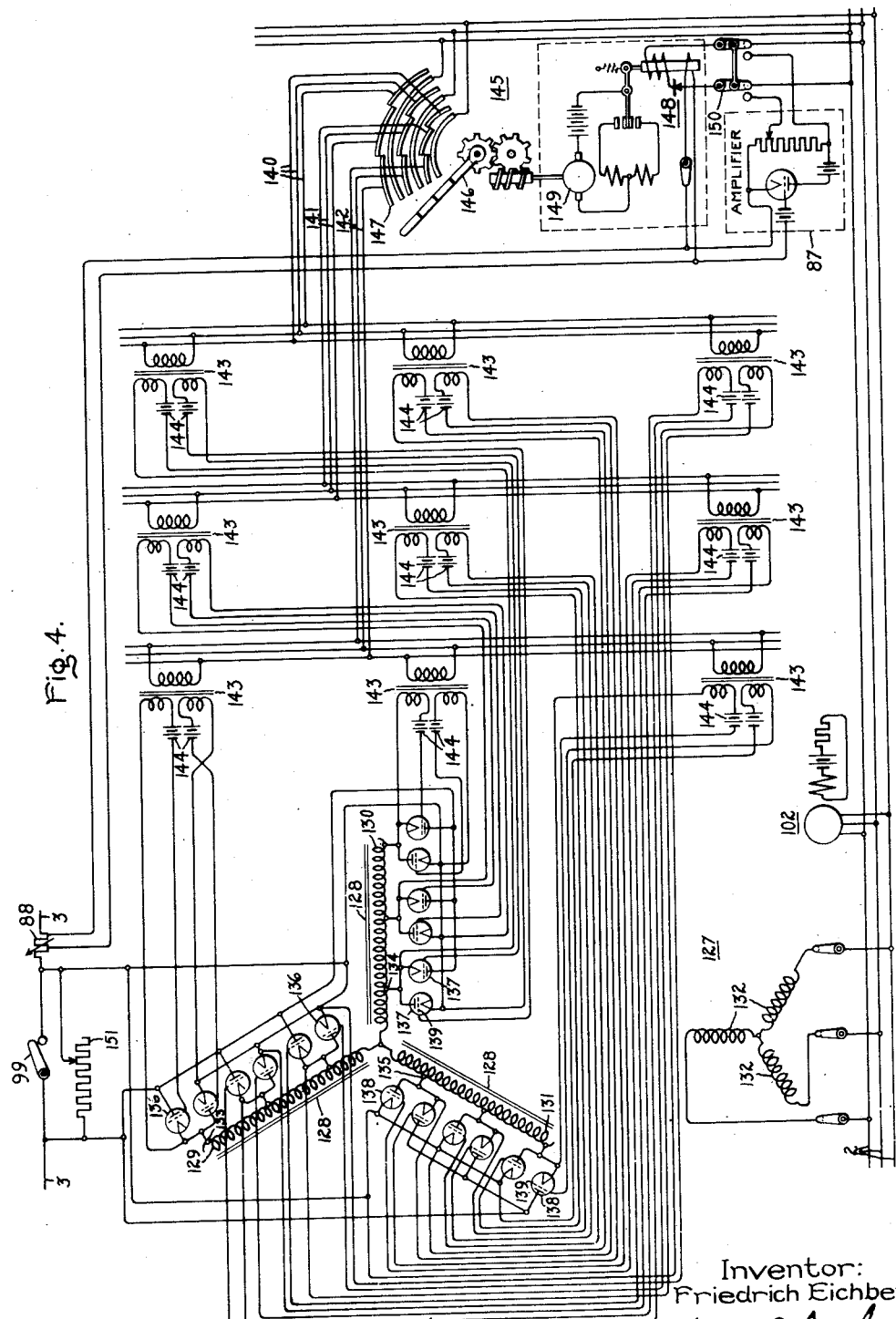
Figure 5:
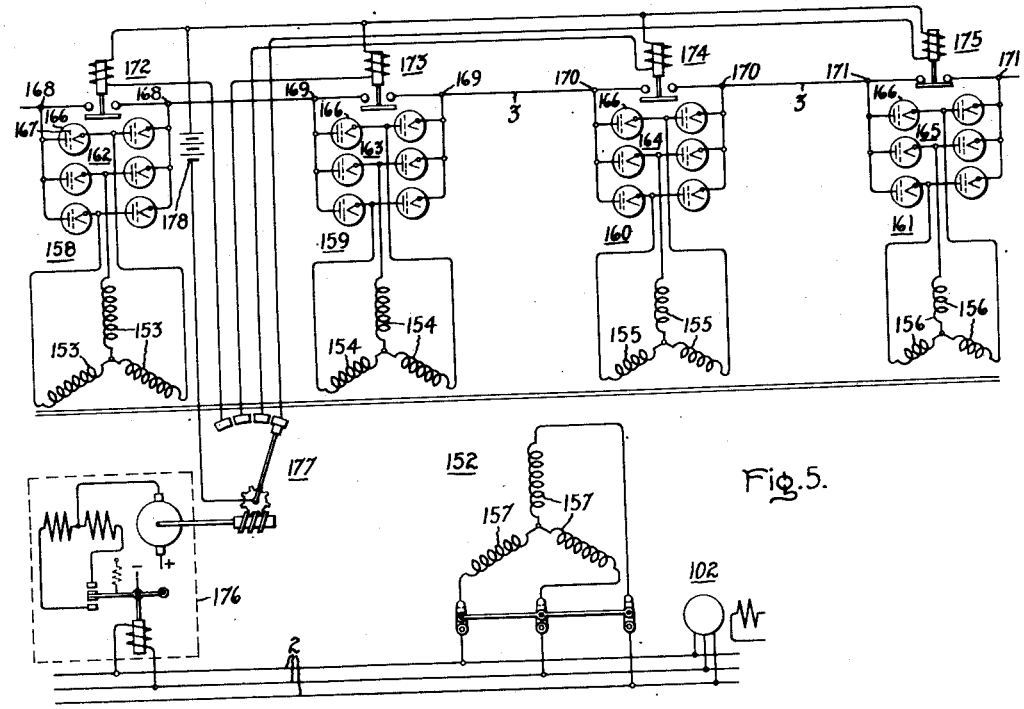
Figure 6:
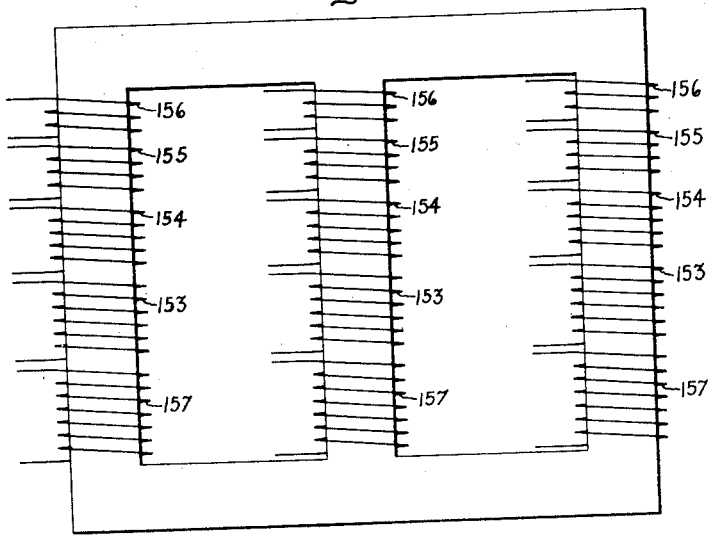

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to an arrangement for transmitting power between two constant voltage alternating current circuits over a constant current or a variable current-level high voltage direct current transmission line. Fig. 1a represents certain operating characteristics of the transforming arrangement in Fig. 1. Fig. 2 diagrammatically illustrates another embodiment of my invention showing in detail the control circuits for operating the electric valve tap-changing apparatus. In Fig. 3 there is diagrammatically illustrated a transformer arrangement to obtain transfer of power between a constant voltage alternating current circuit and a constant current alternating current circuit. Fig. 4 diagrammatically illustrates a still further embodiment of my invention in which power may be transmitted between constant voltage alternating current circuits and constant current or variable current-level direct current systems by means of electric valve apparatus which control an associated transformer. Figs. 5 and 6 diagrammatically illustrate an arrangement in which a multi-primary-winding transformer is connected in translating apparatus for transmitting power between a direct current circuit and a constant voltage alternating current circuit and in which the primary windings are selectively energized through a plurality of electric circuits, each of which comprises electric valve converting apparatus. Fig. 7 illustrates an embodiment of my invention which is similar to that shown in Fig. 5 but in which the number of turns of the primary windings are arranged in a geometric progression in order to obtain precise and smooth control of an electrical condition of an associated circuit. Fig. 8 is a modification of the arrangement shown in Fig. 7, and Fig. 9 diagrammatically illustrates an embodiment of my invention as applied to a general system which may comprise a plurality of generating or transmitting stations and a plurality of receiving stations.

In Fig. 1 of the accompanying drawings I have diagrammatically illustrated my invention as applied to an electric power transmission system for transmitting power between a constant voltage alternating current circuit 1 and a constant voltage alternating current circuit 2 over a high voltage direct current transmission line 3. The system as shown in Fig. 1 is capable of transmitting power in either direction between circuits 1 and 2. However, for the purpose of explaining the system, the translating apparatus associated with the alternating current circuit 1 will be considered as the transmitting station and the translating apparatus associated with circuit 2 will be considered as the receiving station. The translating apparatus at the transmitting and receiving stations are each capable of transmitting power in either direction and each transforms constant voltage alternating current into direct current of constant value, or vice versa. When the term constant current is used, it is to be understood that it is intended to mean a constant current the value of which may be adjusted to suit operating conditions. I provide a transformer 4 having a core member 5, primary windings 6, 7 and 8 and secondary windings 9, 10 and 11, all of which are inductively associated. The secondary windings 9, 10 and 11 are each provided with a plurality of line taps or line terminals 12, 13 and 14, respectively. I provide a plurality of electric valve means each associated with a different one of the terminals to control the operative portion of the windings 9—11 and to effect control thereby of the resultant magnetic field of the transformer 4. In this manner, the transformer 4 serves to transform constant voltage alternating current into alternating current of constant value. More specifically, I provide electric valve means 15, 16 and 17 which are associated with windings 9—11, respectively, of transformer 4 and which operate as tap-changing means to control the resultant magnetic field of the transformer 4. The electric valve means 15—17 are preferably of the type employing an ionizable medium, such as a gas or a vapor, and each comprises an anode 18, a cathode 19 and a control member or grid 20.

To transform the alternating current of constant value into direct current of constant value, I provide an electric valve converter 21 which operates as a rectifier and which comprises a plurality of electric valve means 22 which are also preferably of the type employing an ionizable medium such as a gas or a vapor. The electric valve converter 21 transmits substantially constant unidirectional current to the transmission line 3.

At the receiving station I provide an electric valve inverter 23 comprising a plurality of electric valves 24 which transform the direct current of constant value into alternating current of constant value. The electric valves 24, since they perform the inverting operation, must be of the controlled type. A suitable circuit for this purpose is shown in detail in Fig. 2 to be explained hereinafter.

Interposed between the electric valve inverter 23 and the constant voltage circuit 2, I provide a transformer 25 having a core member 26, a plurality of primary phase windings 27, 28 and 29 and a plurality of secondary phase windings 30—32, inclusive. Primary windings 27, 28 and 29 are each provided with a plurality of taps or line terminals 33, 34 and 35, respectively. I provide electric valve tap-changing apparatus which is associated with the taps 33—35 to control the resultant magnetic field of the transformer 25 and hence to effect transfer of power to the alternating current circuit 2 at substantially constant voltage. Electric valves 36—43, electric valves 44—51 and electric valves 52—59 are associated with the terminals of primary windings 27, 28, and 29, respectively. The electric valves 36—59 are preferably of the type employing an ionizable medium and each comprises an anode 60, a cathode 61 and a control member or grid 62.

The general principles of operation of the embodiment of my invention shown in Fig. 1 will be explained by considering the system when power is transmitted from the constant voltage circuit 1 to the constant voltage circuit 2. The electric valves 15, 16 and 17 at the transmitting end of the system are controlled by the circuits explained hereinafter and control the transformer 4 to transform constant voltage alternating current into alternating current of constant value. The electric valve converter 21 transforms the alternating current of constant value into direct current of constant value and energizes the transmission line 3. At the receiving station of the system, the electric valve inverter 23 transforms the direct current of constant value into alternating current of constant value, and the transformer 25 and the associated electric valve tap-changing means 36—59 transform the alternating current of constant value into alternating current of constant voltage. For a more detailed description of the operation of systems of this nature reference may be had to the description and operation of the arrangement of Fig. 2.

The tap-changing electric valves 15—17 at the transmitting station and the tap-changing electric valves 36—59 at the receiving station control symmetrically the phases of the polyphase system.

The manner in which the transformer 25 and the associated tap-changing electric valves 36—59 operate to transform alternating current of constant value into constant voltage alternating current may be more fully explained by considering the operating characteristics shown in Fig. 1a. Since it is desired to supply power at constant voltage to circuit 2, the magnetic field of transformer 25 must be maintained at a substantially constant value. Since the primary ampere-turns must exceed the secondary ampere-turns by that amount required to establish and maintain the flux in the core member 26 and since the secondary ampere-turns vary under varying power demands, the primary ampere-turns must also be varied with the power delivered. Since the primary current remains constant, it is necessary to vary the number of primary turns under changing load conditions. Vector OA of Fig. 1a may represent the resultant flux in the core member 26, or it may represent the resultant ampere-turns which are required to maintain the flux. Vectors OB, OC and OD represent the secondary ampere-turns for three different values of power transfer, and vectors OE, OF and OG represent the corresponding primary ampere-turns required to maintain the vector OA at the desired constant value. Because the primary current remains constant, the scalar values of vectors OE, OF and OG also represent the number of primary turns which must be operatively connected to maintain the flux linking windings 30—32 at a substantially constant value.

In this connection, it is important to note the importance of controlling or regulating the primary turns rather than the secondary turns. If it were attempted to maintain the output voltage of the transformer constant in a system of this nature by controlling the secondary turns, it would entail the use of a transformer of inordinate and prohibitive proportions.

Fig. 2 diagrammatically illustrates in detail certain features of a portion of the transmission system shown in Fig. 1. More specifically, the arrangement of Fig. 2 illustrates the control circuits for the electric valve tap-changing apparatus associated with transformer 25. The elements shown in Fig. 2 have been assigned reference numerals corresponding to the similar elements in Fig. 1. The electric valve translating apparatus shown in Fig. 2 is capable of operating to transmit power in either direction between the constant current or variable current-level circuit 3 and the constant voltage alternating current circuit 2. The magnetic field of the transformer 25, or the flux linking the primary windings 27, 28 and 29, is controlled by the electric valve means 36—59 in accordance with a predetermined controlling influence, such as an electrical condition of one of the associated circuits. For example, the transformer 25 may be controlled in accordance with the voltage of the alternating current circuit 2, or it may be controlled in accordance with the current of direct current circuit 3. When power is transmitted from the direct current circuit 3 to the alternating current circuit 2, it may be desirable to control the voltage of circuit 2 to maintain the voltage constant. On the other hand, when power is being transmitted to the direct current circuit 3, it may be desirable to maintain the current constant in this circuit. The control system for the electric valves 36—59 is capable of operating to maintain these conditions.

I provide a plurality of control circuits for the electric valves 36—59 to control the conductivities thereof and hence to control the operative portions of windings 27—29 of transformer 25. The electric valves 36—59 are rendered selectively conductive and nonconductive to transfer the current flow between the plurality of terminals 33, 34 and 35 of windings 27, 28 and 29, respectively. As a means for controlling the conductivities of electric valves 36—59 in accordance with an electrical condition, such as the voltage of the alternating current circuit 2, I provide a suitable voltage responsive circuit 63 which may comprise an actuating coil 64, an armature 65, stationary contacts 66 and 67, and a movable contact 68. In order to control or adjust the setting of the voltage responsive circuit 63 for different values of direct current transmitted by the direct current circuit 3, I provide an actuating coil 64' which controls the setting of the circuit 63. The actuating coil 64' may be energized to oppose the effect of the actuating coil 64 so that as the direct current level increases a greater actuating force must be provided by the coil 64 in order to introduce compensating effects to restore the voltage of the alternating current circuit 2 to the desired value. A suitable driving means, such as a reversible motor 69, is employed to control the circuits to be explained hereinafter. The reversible motor 69 comprises an armature member 70 and a pair of field windings 71 and 72. A suitable source of current, such as a battery 73, may be used to energize the field windings 71 and 72.

I provide a plurality of control circuits 74, 75, 76 and 77, the voltages of which are varied to control the conductivities of electric valves 36, 37, 44, 45, 52, 53; 38, 39, 46, 47, 54, 55; 40, 41, 48, 49, 56, 57; and 42, 43, 50, 51, 58, 59, respectively. A plurality of transformers 78 are connected between circuits 74—77 and the electric valves 36—59 to impress on the grids 62 thereof alternating voltages derived from the circuits 74—77. Suitable sources of negative unidirectional biasing potential, such as batteries 79 are connected in circuit with the grids 62. As a means for controlling the energization of circuits 74—77 and hence as a means for controlling selectively the various groups of electric valves associated with windings 27—29 of transformer 25, I provide a plurality of suitable phase shifting means, such as rotary phase shifters 80—83, which are associated with circuits 74—77, respectively. The circuits 74—77 and the associated phase shifters 80—83, respectively, may be arranged to control the electric valves 36—59 in the manner disclosed and claimed in United States Letters Patent 1,914,193 granted June 13, 1933, upon an application of B. D. Bedford and which is assigned to the assignee of the present application. Each of the rotary phase shifters 80—83 is provided with an actuating member 84 which is engaged by an arm 85, which in turn is actuated by the reversible motor 69 through a gear and pinion assembly 86. The arm 85 is arranged to engage successively the actuating members 84 of the rotary phase shifters 80—83 to control the conductivities of the tap-changing electric valves 36—59.

Where it is desired to transmit power from the alternating current circuit 2 to the direct current circuit 3, and where it is desired to maintain the current transmitted to circuit 3 at a substantially constant value, I provide a suitable compensator or amplifier, such as an electric valve amplifier 87, which may be controlled by employing the voltage drop appearing across a suitable shunt 88 which may be connected in series relation with the direct current circuit 3. The amplifier 87 may be employed where it is desired to provide a control voltage of the proper magnitude for the proper energization of control winding 64. It is to be understood that I may employ any other arrangement responsive to an electrical condition of the circuit 3 for obtaining this control. A switch 89 may be connected in circuit with the actuating coil 64 of the circuit 63 to cause the circuit 63 to operate in response to the output voltage of the amplifier 87 and thereby control the circuits 74—77 in a manner to maintain a substantially constant current in the direct current circuit 3.

The electric valve inverter 23 is provided with a plurality of control circuits 90 which control the conductivities of the electric valves 24. To facilitate description of the control circuits, only one of these circuits has been shown. It is to be understood that I may employ any arrangement well known in the art, such as that disclosed and claimed in United States Letters Patent No. 2,114,828 granted April 19, 1938, upon an application of B. D. Bedford and which is assigned to the assignee of the present application. The circuit 90 may be energized from any suitable source of alternating current and is shown as being energized from the alternating current circuit 2 through any conventional phase shifting arrangement, such as a rotary phase shifter 91. The circuit 90 comprises a saturable inductive device, such as a peaking transformer 92, which produces an alternating voltage of peaked wave form. A parallel connected resistance 93 and a unidirectional conducting device 94 are connected in series relation with the grid of the associated electric valve 24. This arrangement offers a relatively low impedance path to the flow of normal grid current and offers a greater impedance to the flow of the so-called "positive ion current." In the event the unidirectional conducting device 94 becomes defective or inoperative, the resistance 93 permits flow of grid current so that the system may remain in operation. A parallel connected capacitance 95 and a resistance 96 are also connected in series relation with the grid of the associated electric valve 24 to impress thereon a negative unidirectional biasing potential. Capacitance 97 is connected across the grid and the cathode of the associated electric valve to absorb transient voltages, and a suitable impedance element 98 may also be connected across the grid and cathode of the associated electric valve 24 to absorb transient voltages and this impedance element may be of the type having a nonlinear impedance-current characteristic.

A suitable means may be employed to take the inverter 23 out of service. For example, a switch 99 may be connected across the direct current terminals 100 and 101 of the inverter to shunt the inverter. A dynamo-electric machine 102 of the synchronous type may be connected to circuit 2.

The operation of the embodiment of my invention shown in Fig. 2 will be explained by considering the system when power is being transmitted from the direct current circuit 3 to the alternating current circuit 2 and when a substantially constant value of direct current is being maintained in the circuit 3. Let it be assumed that it is desired to maintain the voltage of the alternating current circuit 2 at a substantially constant value. For this condition of operation, the circuit 63 is connected to the alternating current circuit 2 through switch 89. Electric valve inverter 23 transforms the direct current of constant value into alternating current of constant value which is transmitted to primary windings 27—29 of transformer 25. Of course, the current transmitted to the windings 27—29 controls the resultant field of the transformer 25 and hence controls the power output and the voltage of secondary windings 31—33. Since the alternating current output of the inverter 23 remains constant irrespective of the impedance offered by the primary windings 27—29, the resultant ampere-turns of the transformer 25 may be controlled by control of the electric valves 36—59. For example, if the load transmitted by the system increases, in order to maintain the voltage of the alternating current 2 substantially constant, it is necessary to increase the number of primary ampere-turns of the transformer 25 in order that the resultant magnetic field of the transformer 25 be maintained substantially constant. Stated in other words, the primary ampere-turns of the transformer 25 are controlled to maintain substantially constant the magnetic field linking secondary windings 31—33.

Let it be assumed that the system is operating to transmit power to the alternating current circuit 2 at substantially constant voltage and that current is transmitted to windings 27, 28 and 29 through electric valves 38, 39; 46, 47; and 54, 55. Under this condition of operation, the arm 85 will engage the member 84 of rotary phase shifter 81 to control the conductivities of these valves to effect a smooth and precise control of the effective current transmitted to the windings 27—29 and also maintains the voltage of circuit 2 at a substantially constant value. If the amount of load increases sufficiently to cause the voltage of circuit 2 to decrease temporarily, the arm 85 will be moved to engage the actuating member 84 of rotary phase shifter 82 to cause electric valves 40, 41; 48, 49; and 56, 57 to be rendered conductive, thereby increasing the active portions of windings 27—29 and effecting a substantial increase in the number of primary ampere-turns of transformer 25. In this manner the resultant ampere-turns of the transformer 25 or the resultant field linking the secondary windings 31—33 is maintained substantially constant under varying load conditions. Conversely, if the load transmitted by the system decreases sufficiently, effecting a corresponding increase in the voltage of the alternating current circuit 2, the arm 85 will be moved to engage actuating member 84 of the phase shifter 80 so that electric valves 36, 37; 44, 45; and 52, 53 are rendered conductive. This action decreases the effective portions of primary windings 27—29 and thus tends to maintain the resultant magnetic field associated with the secondary windings at a substantialy constant value. It will be appreciated that the tap-changing electric valves 36—59 control the resultant magnetic field of the transformer 25 under varying load conditions to transmit power from the constant current direct current circuit 3 to the alternating current circuit 2 at a substantially constant voltage.

The transfer of current between the various terminals of the primary windings 27—29 is effected by the control of the associated tap-changing electric valve means. This selective transfer of current is obtained by controlling the conductivities of the electric valves 36—59. The control circuits 74—77 and the associated phase shifters 80—83 control in a gradual and smooth manner the primary ampere-turns of the transformer 25. This smooth and symmetrical control of the phase windings is obtained by effecting current transfer between the various groups of electric valves associated with different taps of the windings 27—29. For example, during a portion of a cycle an electric valve in one group may conduct current and the current will be commutated to a corresponding electric valve in another group during the latter part of the cycle, effecting thereby a gradual change in the primary ampere-turns. For a complete explanation of the operation of the tap-changing valves, reference may be had to United States Letters Patent 1,914,193.

The system also permits transfer of power from the constant voltage alternating current circuit 2 to the constant current direct current circuit 3. For this condition of operation, switch 89 is connected to the shunt 88 through amplifier 87 which controls the circuit 63 to maintain constant current in circuit 3.

Fig. 3 diagrammatically illustrates another embodiment of my invention relating to an arrangement for controlling the reluctance of a transformer 103 to effect transfer of power between a constant current alternating current circuit and a constant voltage alternating current circuit. The transformer 103 is provided with a core member 104, constant current primary windings 105—107 and constant voltage secondary windings 108—110. The primary windings 105—107 may be connected to a system such as that shown in Fig. 2 and may be energized from the output circuit of the electric valve inverter 23. Of course, the transformer 103 may be connected to an electric valve rectifier as well as to an electric valve inverter in systems of the nature above described. The transformer 103 is also provided with control windings 111—113 which control the flux linking the secondary windings 108—110.

As an arrangement for controlling the reluctance of the core member 104 of the transformer 103, I provide suitable means such as positionable core portions, such as wedges 114 and 115. These wedges, which are adjustable in position, control the flux and hence the magnetic field linking the secondary windings 108—110. I may employ any suitable arrangement for positioning the wedges 114 and 115, such as reversible motors 116, 117 and gear and pinion assemblies 118 and 119, respectively. It is to be understood that the illustrated means for positioning the wedges 114 and 115 is merely symbolic of one way in which the reluctance of the core member 104 may be varied to control the voltage of windings 108—110. Relays 120 and 121 are employed to control the reversible motors 116 and 117 in accordance with a predetermined electrical condition, such as the voltage of the alternating current circuit 2.

As a means for controlling the current transmitted by the control windings 111—113 in accordance with a predetermined electrical condition, such as the voltage of circuit 2, I provide a plurality of variable impedance elements 122—124 which are connected in circuit with the windings 111—113. The windings 111—113 may be short circuited through the variable impedance elements 122—124. I provide a suitable actuating means such as a reversible motor 125 for operating the impedance elements 122—124. The reversible motor 125 may be energized from a suitable relay 126 which is responsive to a predetermined controlling influence such as the voltage of the alternating current circuit 2.

The operation of the embodiment of my invention as shown in Fig. 3 will be explained by considering the transformer when it is connected into a system such as that shown in Fig. 2. If it be assumed that it is desired to maintain the voltage of circuit 2 substantially constant under varying load conditions, the wedges 114 and 115 are positioned in response to the voltage of circuit 2 to maintain the magnetic field linking windings 108—111 at a substantially constant value. It is to be noted that the transformer 103 may be controlled by either or both of the arrangements shown in Fig. 3, that is, the transformer may be controlled by the positioning wedges 114 and 115, or it may be controlled by adjustment of the current controlling means 112—124. When the transformer is operated by controlling the current flowing in control windings 111—113, the current transmitted by the windings 111—113 is increased as the load decreases. Conversely, as the load increases, the current transmitted by the windings 111—113 is increased to maintain the magnetic field linking windings 108—110 substantially constant.

It is to be understood that the transformer arrangement shown in Fig. 3 may be applied to systems, such as that shown in Fig. 2, where power is being transmitted in either direction between a constant current direct current circuit and a constant voltage alternating current circuit. Furthermore, it is emphasized that where an alternating current of constant value is transmitted to the windings 105—107 the transformer and the associated control apparatus supply a substantially constant alternating voltage to circuit 2.

Fig. 4 diagrammatically illustrates a further embodiment of my invention for transmitting power between a constant current direct current circuit 3 and a constant voltage alternating current circuit 2. A transformer 127 is connected between the direct current circuit 3 and the alternating current circuit 2 and, in conjunction with electric valve apparatus described hereinafter, transforms direct current of constant value or variable-level direct current into alternating current of constant voltage. The transformer 127 is provided with a core member 128, primary windings 129—131 and secondary windings 132. Primary windings 129—131 are each provided with a plurality of taps or line terminals 133, 134 and 135, respectively. I provide a plurality of electric valve means 136, 137 and 138 which are associated with windings 129—131, respectively, and which operate both as rectifiers or inverters and as tap-changing devices. Electric valves 136—138 are preferably of the type employing an ionizable medium and each is of the control type employing a control member or grid 139.

I provide a plurality of control circuits 140, 141 and 142 which energize the grids 139 of electric valves 136—138 to control the operative portions of windings 129—131 and hence to control the resultant magnetic field of the transformer 127. In addition, the control circuits 140—142 control the electric valves 136—138 so that these electric valves transform direct current of constant value into alternating current of constant value. These two functions are performed simultaneously. A plurality of grid transformers 143 energize the control grids 139 of the electric valves and suitable sources of negative unidirectional biasing potential, such as batteries 144, impress on the control grids 139 voltages tending to maintain the electric valves nonconductive until the associated transformers 143 are energized.

I provide means for controlling the circuits 140—142 to control a predetermined electrical condition of the alternating current circuit 2, or a predetermined electrical condition of the direct current circuit 3. For example, I provide means for maintaining the voltage of circuit 2 constant when power is being transmitted to circuit 2, and means for maintaining the current of circuit 3 constant when power is transmitted to circuit 3. More particularly, I employ a suitable switching device 145 having a movable contact member 146 and a plurality of stationary contacts 147. The switching device 145 is arranged to effect selective energization of circuits 140—142 and the contacts are arranged to permit an overlapping action which effects concurrent energization of two of the circuits in the transition period. The switching device 145 is energized by any conventional relay 148 which may include a reversible motor 149 to control the switching device 145 in accordance with predetermined controlling influences, such as the voltage of circuit 2 or the current of circuit 3. The amplifier 87 may be connected to the relay 148 through a switch 150 so that the relay 148 operates to maintain constant current in circuit 3 when power flows from circuit 2 to circuit 3.

A suitable current by-pass, such as an adjustable resistance 151, may be connected across the switch 99 to transmit current during the short intervals of time during which current is being transferred between various groups of electric valves. In this manner continuity of operation of the translating circuit is assured.

The embodiment of my invention diagrammatically shown in Fig. 4 is capable of operating to transmit power in either direction between the direct current circuit 3 and the constant voltage alternating current circuit 2. The electric valves 136—138 perform dual functions; that is, these electric valves operate as tap-changing devices and also act as rectifiers or inverters depending upon the direction of power transfer. When power is transmitted from the direct current circuit 3 to the alternating current circuit 2, the electric valves 136—138 operate as inverters to transform direct current of constant value into alternating current of constant value and also control the operative portions of primary windings 129—131, thereby controlling the resultant magnetic field of the transformer to transmit power at substantially constant voltage to the alternating current circuit 2. The selective operation of the various groups of valves associated with taps or terminals 133—135 is effected by the selective energization of control circuits 140—142, which in turn are controlled by the switching device 145. For example, when the arm or movable contact 146 of the switching device 145 is in the left-hand position, effecting energization of control circuit 142, the electric valves connected to the outermost terminals of the windings are rendered conductive. When the contact 146 is in the intermediate position, the electric valves associated with the intermediate terminals of windings 129—131 are rendered conductive, and when the contact 146 is in the right-hand position the electric valves associated with the innermost terminals are rendered conductive. Since the position of the contact 146 is controlled by the relay 148, the primary ampere-turns of the transformer 127 are controlled in accordance with a predetermined electrical condition, such as the voltage of circuit 2, maintaining the magnetic field which links secondary windings 132 at a substantially constant value.

When it is desired to transmit power from the constant voltage circuit 2 to the constant current direct current circuit 3, switch 150 is positioned to connect the output circuit of the amplifier 87 to the relay 148. For this condition of operation, the electric valves 136—138 are controlled so that a substantially constant current is transmitted to the direct current circuit 3. When power is flowing from circuit 2 to circuit 3, the electric valves 136—138 operate as rectifiers and also effect selective transfer of current between the various taps of windings 129—131 in order to maintain the current transmitted to circuit 3 at a constant value.

In Fig. 5 I have diagrammatically illustrated another embodiment of my invention relating to an arrangement for transmitting power between a constant voltage alternating current circuit 2 and a constant current or variable-current-level direct current circuit 3. I provide a tansforming means such as a transformer 152 comprising a plurality of groups of primary windings 153—156 which are provided with different numbers of turns in order to control the resultant magnetic field linking secondary windings 157. The groups of primary windings may each be arranged to have different numbers of turns, or the primary windings may be arranged to have several groups of windings some of which have the same number of turns. These windings and the number of turns are chosen to a desired pattern in order to obtain smooth and gradual control of the ampere-turns of transformer 152 and to permit precise control of the voltage of circuit 2. It is to be understood that I may employ a plurality of transformers instead of a single transformer for the transforming means. I provide a plurality of electric circuits 158—161 for effecting energization of the groups of primary windings 153—156 and which, therefore, control the magnetization of the transformer 152. Electric circuits 158—161 each include means for transforming direct current of constant value into alternating current of constant value and comprise electric valve inverters 162—165, respectively. The electric valve inverters 162—165 each include a plurality of electric valve means 166 which are preferably of the type employing an ionizable medium and having a grid 167 which controls the conductivity thereof. The grids 167 are energized by suitable grid circuits, such as grid circuit 90 shown and described in connection with Fig. 2. Direct current terminals 168—171 of inverters 162—165 are connected in series relation with each other and are connected to the constant current direct current circuit 3.

As a means for selectively controlling the energization of electric circuits 158—161 and hence as a means for controlling the magnetization of transformer 152, I provide a plurality of relays or switches 172—175 which are arranged to shunt the direct current terminals 168—171, respectively. When the relays 172—175 are energized, the direct current terminals of the associated electric valve inverters are shunted, effecting deenergization of the associated electric circuits. Of course, when the relays 172—175 are deenergized, the associated electric valve inverters are energized and the corresponding or associated primary windings of transformer 152 are energized.

To effect selective energization of electric circuits 158—161 in accordance with a predetermined controlling influence, such as the voltage of the circuit 2, I provide a suitable relay 176 which controls the switching device 177. The relays 172—175 may be energized from any suitable source of current such as a battery 178.

Let it be assumed that a substantially constant direct current is transmitted to the circuit 3 and that it is desired to supply a constant alternating voltage to circuit 2. Under varying load conditions in order to maintain the voltage of circuit 2 constant, it is necessary to maintain the resultant magnetic field linking secondary windings 157 at a substantially constant value. The electric valve inverters 162—165, when operatively connected, each transform direct current of constant value into alternating current of constant value which is transmitted to primary windings 153—156, respectively. The relays 172—175 control the energization of the primary windings in response to voltage under varying load conditions to maintain the voltage of circuit 2 constant. The phases of the system are controlled symmetrically, that is the regulation takes place in all of the phases. For example, for the condition of operation shown in Fig. 5, electric circuits 158—160 are effecting energization of primary windings 153—155. If it be assumed that the load transmitted by the system increases, effecting a corresponding reduction in voltage of circuit 2, the switching device 177 will operate so that relay 175 is deenergized, effecting energization of primary windings 156 and thereby increasing the number of primary ampere-turns for each phase and tending to restore the voltage of circuit 2 to the desired value. Conversely, if the amount of load transmitted by the system decreases, effecting a corresponding increase in the phase voltages of circuit 2, switch 177 will operate to energize relay 174 to deenergize primary windings 155, thereby reducing the magnetic field associated with secondary windings 157 and tending to restore the voltage of circuit 2 to the desired value.

While the embodiment of my invention shown in Fig. 5 has been explained for operation in a system in which power is transmitted from circuit 3 to circuit 2, it will be understood that the system is capable of operating to transmit power in the reverse direction to maintain a constant current in the circuit 3. If such an arrangement is desired, it is to be understood that I may employ constant current regulators such as those shown in Figs. 2 and 4 for energizing the relay 176.

Fig. 6 is a diagrammatic representation of the manner in which the transformer 152 may be arranged, and the windings there illustrated have been assigned reference numerals corresponding to similar elements in Fig. 5. It is to be understood that Fig. 6 is a mere diagrammatic representation of the manner in which the transformer windings are arranged, and that the windings in practice may be arranged to reduce leakage reactance in the usual conventional manners.

In Fig. 7 there is diagrammatically illustrated another embodiment of my invention for transmitting power between a direct current circuit and an alternating current circuit. The system there illustrated is applicable for the transmission of power between a constant current or a variable current-level direct current circuit and a constant voltage alternating current circuit. I provide a transformer 179 having a plurality of primary windings which are arranged to have different numbers of turns. For example, the number of turns may be arranged to have increasing or ascending numbers of turns. The number of turns may be arranged in an increasing, ascending or progressive order or pattern, such as that established by an arithmetical or a geometrical progression. Or if desired, to have a smooth control the windings may be arranged in an ascending order in which one or more turn-numbers are used in the pattern. More specifically, in accordance with the teachings of my invention I may employ a transformer having a plurality of primary windings 180—185 which, for the purposes of explanation, is illustrated as having 1, 2, 4, 8, 16 and 32 turns, respectively. That is, the ratio of the geometric progression is two, and, of course, the ratio may be any desired integer. The primary windings 180—185 are energized selectively by electric circuits which include means for transforming direct current into alternating current, or vice versa. These transforming means may be electric valve converting apparatus which operate as inverters or rectifiers. For the purpose of illustration, I have chosen to show electric valve inverters 186—191 connected between the direct current circuit 3 and the primary windings 180—185, respectively. Each of the electric valve inverters comprises a plurality of electric valves 192 which are preferably of the type employing an ionizable medium and each of which comprises a control member or control grid 193. When the electric valve converting apparatus 186—191 operate as inverters, it is to be understood that I may employ any conventional grid circuit such as the circuit 98 shown in Fig. 2.

In order to effect selective energization of the primary windings 180—185 and to effect thereby a smooth control of the magnetization of the transformer 179, I provide a plurality of controlling means for controlling the electric valve inverters 186—191. These controlling means may comprise a plurality of relays or switches 194—199 which are arranged to shunt the direct current terminals of the electric valve converters to render the associated primary windings ineffective. The switches 194—199 are arranged to short circuit or shunt the direct current terminals of the associated electric valve converter when in the closed circuit position.

To energize the switches 194—199 severally and in various combinations to effect gradual and precise control of the magnetization of the transformer 179, I provide a suitable switching device 200 which may be of the drum controller type having a plurality of stationary contacts 201 and a plurality of movable contacts 202. The diagrammatic representation of the drum controller 200 is a fragmentary one and does not include all the steps which would be required to obtain gradual change in the magnetization of the transformer 179 from a no-load condition to the full-load condition, but does represent a sufficient portion to illustrate adequately applicant's invention. As a means for controlling the energization of the primary windings 180—185 in accordance with a predetermined controlling influence, I employ a suitable relay well known in the art, such as relay 203 which is arranged to be responsive to a predetermined controlling influence, such as the voltage of the alternating current circuit 2. The relay 203 may comprise a reversible motor 204 having a pair of field windings 205 and 206 and a voltage responsive element 207 which effects selective energization of the field windings 205 and 206 to control the direction of rotation of the drum controller 200.

The operation of the embodiment of my invention shown in Fig. 7 will be explained by considering the system when it is desired to transmit power from the constant current direct current circuit 3 to a constant voltage alternating current circuit 2. In order to keep the magnetic field linking the secondary windings at a substantially constant value and hence in order to maintain the voltage produced thereby at a substantially constant value, the energization of the primary windings must be controlled in accordance with the voltage or other predetermined conditions of the alternating current circuit 2. This control is effected through the relay 203 and the controller 200. As the load increases, the primary ampere-turns of the transformer 179 are increased gradually to effect a smooth control of the voltage of circuit 2. Of course, the phase voltages are controlled symmetrically. For example, if the voltage of circuit 2 is decreased upon application of an increment of load, the relay 203 causes the drum controller 200 to move to that position which restores the voltage to the desired value. The drum controller 200 selectively controls the switches 194—199 to open the direct current terminals of various electric valve converters so that the resultant ampere-turns of the transformer 179 are sufficient to restore the voltage to the desired value. The drum controller 200 energizes the switches 194—199 severally or in various combinations, depending upon the voltage of circuit 2 and hence depending upon the amount of load being transmitted by the system. For example, in the arrangement of primary windings shown in Fig. 7, the primary turns of the transformer 179 may be varied in steps of one from 1 to 63, permitting thereby a regulation not exceeding $^{100}/_{63}\%$, that is, a regulation not exceeding 1.58%.

As a general proposition, it is to be understood that I may employ a transformer or a group of transformers having a plurality of windings the number of turns of which are arranged in a desired scheme to obtain a gradual control of the ampere-turns of the transformer, or transformers, as the load on the system varies. Instead of using an arrangement in which the turns of the primary windings are arranged in a geometrical progression, it is to be understood that I may employ any other system in which the turns are chosen to obtain a smooth control. For instance, I may choose to use an arrangement in which the primary turns are: $n$, $2n$, $3n$, $7n$, $7n$ and $7n$. A review of the above discussed manner of arranging the primary turns in progressions indicates that incremental or decremental variations in the primary ampere-turns not exceeding ten per cent of the total primary ampere-turns may be effected, thereby permitting gradual variation in the magnetization of the transformer under variable load conditions.

It is to be understood that I may employ a transformer in which the number of turns of the primary windings are arranged in a geometric progression but in which the number of turns of the smallest winding is represented by $n$, in which case the geometric progression representing the turns will be: $n$, $2n$, $4n$, $8n$, $16n$, $32n$, etc. Furthermore, it is to be understood that I may employ, within the scope of my invention, an arrangement in which the number of turns of the primary windings are arranged in any geometric progression where the ratio "$a$" is any arbitrarily chosen number, in which case the geometric progression may be represented as $n$, $an$, $a^2n$, $a^3n$, $a^4n$, $a^5n$, etc.

Fig. 8 represents another embodiment of my invention which is similar in many respects to the arrangement shown in Fig. 7, but in which the primary turns of the transformer are arranged to effect a material reduction in the value of the voltage applied across each of the electric valve converters for a particular load applied. For example, I provide a transformer 208 having a plurality of primary windings 209—213 and having secondary windings 214. The primary windings 209—213 are arranged to have 1, 2, 4, 4 and 4 turns, respectively. Of course, this arrangement of turns may be expressed generally for windings 209—213 as $n$, $2n$, $4n$, $4n$ and $4n$. By such a combination of groups of primary windings having this relation of turns, it is possible not only to obtain smooth and precise control of the magnetization of the transformer 208 and hence obtain precise control of the voltage of circuit 2 or of the current of circuit 3, but also to effect a substantial reduction in the value of the voltage applied across the electric valve inverters 215—219 which are associated with windings 209—213, respectively.

I also provide a plurality of switching units 220—224 which control the electric valve converters 215—219 to effect selective energization of the primary windings 209—213, respectively. I provide a suitable means, such as a drum controller 225, for effecting gradual control of the magnetization of the transformer 208, thereby controlling in a smooth manner the voltage produced by the secondary windings 214 when variable amounts of power are being transmitted from the direct current circuit 3 to the alternating current circuit 2, or for effecting precise control of the direct current transmitted to circuit 3 from circuit 2 when power is being transmitted in the opposite direction. The drum controller 225 may comprise a plurality of stationary contacts 226 which cooperate with the movable contacts 227 of the drum controller to energize selectively switching units 220—224. The drum controller 225 operates switches or relays 220—224 severally and in various combinations, depending upon the position of the drum controller to effect the desired energization of various groups of primary windings 209—213.

The embodiment of my invention shown in Fig. 8 operates in substantially the same manner as that explained above in connection with the arrangement shown in Fig. 7. However, for a given load transmitted from the direct current circuit 3 to the alternating current circuit 2, the arrangement shown in Fig. 8 applies a lower voltage to the electric valve converters 215—219 than would be applied by the arrangement of Fig. 7. This reduction in operating voltages impressed on the electric valves of the converters 215—219 is obtained by employing a plurality of groups of primary windings having approximately the same number of turns. More specifically, it will be noted that primary windings 211—213 each are arranged to have the same number of turns, so that when the load transmitted requires a predetermined number of primary ampere-turns to maintain the voltage of circuit 2, the voltage control may be effected by using three groups of primary windings, as, for example, the primary windings 211—213. Since the associated electric valve converters 217—219 are connected in series relation, the voltage impressed across the terminals of each group of primary windings is substantially reduced below that which would be required if a single primary winding of a larger number of turns were employed, or is reduced below that value which would exist if a pair of primary windings of a proper number of turns were used with corresponding inverting apparatus. For example, if the load required twelve primary turns and if a single inverter were employed, the total direct current voltage would be impressed across the terminals of the inverter. However, in accordance with the teachings of my invention the voltage on the electric valve converters is decreased by employing a plurality of separate groups of primary windings, each group of which is provided with an associated electric valve converter, and the electric valve converters are connected in series relation to reduce the voltage impressed across each set of valves. Of course, it is to be understood that the system shown in Fig. 8 is capable of operating to transmit power in either direction between circuits 2 and 3.

The arrangement of Fig. 8 also operates in a highly satisfactory manner and offers suitable regulation. For example, the arrangement of Fig. 8 permits transfer of power from circuit 3 to circuit 2, permitting a regulation not exceeding $^{100}/_{15}\%$, that is, a regulation not exceeding 6.66%.

Fig. 9 diagrammatically illustrates a system in which various aspects of the embodiments of my invention described above may be employed. For example, for the purposes of illustration, I have shown my invention as applied to a system for transmitting power between constant voltage alternating current circuits through a direct current circuit, which may be a constant current, direct current circuit or a variable current-level direct current circuit. The stations may be connected at random to the direct current transmission system. In systems of this nature, the transmitting and receiving functions of the respective units are performed substantially independently of the current level at which power is being transmitted over the direct current circuit. By virtue of this feature, it is possible to arrange the system in a very flexible manner for the transmission and distribution of electric power. The transmitting stations may be located at the places where the generation of power is economically most feasible, as for example, near water power sources. In addition, the receiving stations may be placed near the centers of power consumption. For instance, the system may be arranged to have transmitting stations 228 and 229 and a plurality of receiving stations 230—235. The transmitting stations 228 and 229 may be energized from constant voltage alternating current circuits 236 and 237, and the receiving stations 230—235 may be arranged to energize constant voltage alternating current circuits 238—243, respectively. Each of the transmitting and receiving stations may be any one of the electric translating systems disclosed and described above in connection with Figs. 1 to 8. For the purpose of illustration, however, I have chosen to represent somewhat in detail one of the receiving stations, such as receiving station 230. The receiving station 230 may comprise a transformer 244 having secondary windings 245 and a plurality of groups of primary windings 246—248 of different numbers of turns which are energized through electric valve converting apparatus 249—251. The electric valve converting apparatus 249—251, of course, may be arranged to operate either as rectifiers or inverters to transmit power from the constant voltage alternating current circuit 238 to the direct current circuit 3, or vice versa. Each of the electric valve converters 249—251 comprises a plurality of electric valve means 252 which are preferably of the type employing an ionizable medium, such as a gas or a vapor, and which include control members or grids 253. The direct current terminals of the electric valve converting apparatus 249—251 are connected in series relation with each other and under full load conditions are all energized in series relation from the direct current circuit 3. Control of the voltage of circuit 238 when power is being transmitted from circuit 3 to circuit 238 under varying load conditions is obtained by effecting selective energization of the primary windings 246—248 severally or in various combinations. To energize selectively the primary windings 246—248, I employ a plurality of switching devices 254, 255 and 256 which are associated with primary windings 246—248, respectively. Switching devices 254—256 may be controlled by arrangements similar to that disclosed in Figs. 7 and 8 discussed above. A voltage responsive circuit, such as the voltage responsive arrangement 203 shown in Fig. 8, may be employed to operate a drum controller to effect this selective energization of switching devices 254—256.

The system shown in Fig. 9 operates in a very flexible and satisfactory manner to permit transfer of electric power from the transmitting stations 228 and 229 to the various receiving stations 230—235. It is to be understood that if it is desired to put any of the receiving or transmitting stations out of service, that station may be so effected by merely closing the switching devices which shunt the electric valve converting apparatus. Furthermore, the receiving and transmitting stations may be put into operation by merely opening the contacts connected across the direct current terminals of the converting apparatus. It is emphasized that the receiving stations and the transmitting stations may be of different ratings and each may contribute power to or absorb power from the direct current circuit 3. For example, the transmitting station 228 may supply power to the direct current circuit 3 at 100 amperes and at voltages ranging from zero to a maximum of 300,000 volts, and the transmitting station 229 may transmit power to the direct current circuit at 100 amperes and at voltages ranging from zero to a maximum of 200,000 volts. It is to be understood that the power transmitted to the direct current circuit 3 is in the form of variable voltage direct current, and that the transmitting stations 228 and 229 may operate to maintain the current in the direct current circuit 3 at a substantially constant value or at any one of a number of different current levels. The net voltage impressed on the direct current circuit 3 of course varies to maintain the current at the desired current level. Under full load conditions, the receiving station 230 may be arranged to have impressed thereacross a maximum voltage of 140,000 volts, and by virtue of the design of the primary windings 246—248 the voltage appearing across the terminals of the converting apparatus 249—251 may be maxima of 20,000, 40,000 and 80,000 volts, respectively. The other transmitting stations may be designed to absorb the power in the amounts indicated on the drawing. Of course, the receiving stations may be controlled at will in accordance with the power demands and as the power demand varies, the voltage appearing across the terminals of the receiving stations will, of course, vary. The generating stations transmit power at a substantially constant current-level and variable voltage so that the individual receiving stations transform the constant current direct current into alternating current of different predetermined voltages.

It is to be understood that the magnitude of the voltages and currents stated above in connection with the system of Fig. 9 are merely exemplary of a system which might be constructed in accordance with my invention, and that other combinations of transmitting and receiving stations and other choices of voltages and currents may be employed without departing from the spirit of my invention.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a constant current alternating current circuit, a constant voltage alternating current circuit, and apparatus for transmitting power between said constant current alternating current circuit and said constant voltage alternating current circuit and comprising a transformer provided with taps, tap changing electric valve means associated with said taps for selectively controlling the taps of said transformer to transform alternating current of constant value into alternating current of constant voltage, or vice versa, and means responsive to the voltage of said constant voltage alternating current circuit for controlling said tap changing electric valve means.

2. In combination, a constant current alternating current circuit, an alternating current circuit, a transformer connected between the alternating current circuits and including a winding having a predetermined number of line terminals, a plurality of electric valve means each associated with a different one of said terminals, and means responsive to the voltage of the second mentioned alternating current circuit for controlling said plurality of electric valve means to transmit power to the second mentioned alternating current circuit at a predetermined voltage.

3. In combination, a constant voltage alternating current circuit, a second alternating current circuit, electric translating apparatus connected between said circuits for transforming constant voltage alternating current into constant current alternating current and comprising a transformer provided with taps and connected to said alternating current circuit, electric valve tap-changing means associated with said taps for controlling said transformer, and means responsive to the voltage of the first mentioned alternating current circuit for selectively controlling said electric valve tap changing means to effect a constant voltage-constant current transfer of power between the alternating current circuits.

4. In combination, a constant voltage alternating current circuit, a constant current alternating current circuit, a transformer provided with taps connected to said second mentioned alternating current circuit, tap-changing electric valve means associated with said taps for controlling said transformer to transform constant voltage alternating current into constant current alternating current, and means responsive to an electrical condition of one of the alternating current circuits for selectively controlling said electric valve means.

5. In combination, a constant voltage alternating current circuit, a constant current alternating current circuit, means for transmitting power between said circuits comprising transforming means and including a winding having a plurality of line terminals, and electric valve means connected to said terminals for controlling the magnetization of said transformer to obtain a constant voltage-constant current power transformation.

6. In combination, a constant voltage alternating current circuit, a constant current alternating current circuit, means for transmitting energy between said circuits and including a winding having a plurality of line terminals, electric valve means connected to said terminals for controlling the operative portion of said winding, and means for controlling the conductivities of said electric valve means to obtain a constant voltage-constant current transformation.

7. In combination, a constant current direct current circuit, a constant voltage alternating current circuit, and translating apparatus for transmitting power between said circuits and comprising a winding having a plurality of line terminals and a plurality of electric valve means each associated with a different one of said terminals for controlling the operative portion of said winding to transform direct current of constant value into alternating current of constant voltage, or vice versa.

8. In combination, a constant current direct current circuit, an alternating current circuit, and translating apparatus connected between said circuits and comprising a winding having a plurality of line terminals and a plurality of electric valve means each associated with a different one of said terminals for controlling the operative portion of said winding to transform direct current of constant value into alternating current of constant voltage.

9. In combination, a constant current direct current circuit, an alternating current circuit, means connected between said circuits and comprising a winding having line terminals, a plurality of electric valve means each associated with a different one of said terminals to control the operative portion of said windings, and means for controlling said electric valve means to effect transfer of power from said direct current circuit to said alternating current circuit at constant voltage.

10. In combination, a constant current direct current circuit, an alternating current circuit, means connected between said circuits for transforming constant current direct current into alternating current of predetermined voltage and comprising transforming means including a winding provided with a plurality of line terminals, and a plurality of electric valve means each associated with a different one of said terminals for controlling the portion of said windings which is operatively connected to said direct current circuit to effect transfer of power from said direct current circuit to said alternating current circuit.

11. In combination, a constant current direct current circuit, an alternating current circuit, means connected between said circuits for transforming constant current direct current into alternating current of predetermined voltage and comprising transforming means including a plurality of windings electrically displaced in phase and each of which is provided with a plurality of terminals, and electric valve means each associated with a different one of said terminals for controlling the portion of the associated winding operatively connected to effect transfer of power from said direct current circuit to said alternating current circuit.

12. In combination, a constant current direct current circuit, an alternating current circuit, means connected between said circuits for transforming constant current direct current into alternating current of predetermined voltage and comprising an inductive network including a plurality of phase windings each of which is provided with a plurality of terminals, and electric valve means each associated with a different one of said terminals for controlling the portion of the associated winding operatively connected to effect transfer of power from said direct current circuit to said alternating current circuit.

13. In combination, a constant current direct current circuit, an alternating current circuit, an inductive network connected between said circuits and comprising a plurality of phase windings each of which includes a plurality of line terminals, electric valve means each associated with a different one of said terminals, and means for controlling said electric valve means to control the resultant magnetic field associated with each of said phase windings to control the phase voltages.

14. In combination, a constant current direct current circuit, an alternating current circuit, an inductive network connected between said circuits and including a plurality of phase windings each of which includes a plurality of line terminals, a plurality of electric valve means each associated with a different one of said terminals, and means responsive to a predetermined electrical condition of said alternating current circuit for controlling said electric valve means to effect transfer of power from said direct current circuit to said alternating current circuit at constant voltage.

15. In combination, a constant current direct current circuit, an alternating current circuit, an inductive network connected between said circuits and comprising a plurality of phase windings each of which includes a plurality of line terminals, a plurality of electric valve means each associated with a different one of said terminals, and means responsive to the voltage of said alternating current circuit for controlling said electric valve means to effect transfer of power between said direct current circuit and said alternating current circuit at constant voltage.

16. In combination, a constant current direct current circuit, an alternating current circuit, an inductive network connected between said circuits and comprising a plurality of phase windings each of which includes a plurality of line terminals, a plurality of electric valve means each associated with a different one of said terminals for controlling the portion of the associated winding which is connected in operative relation, each of said electric valve means being of the type having a control member for controlling the conductivity thereof, and means for energizing the control members.

17. In combination, a constant current direct current circuit, an alternating current circuit, an inductive network connected between said circuits and comprising a plurality of phase windings each of which is provided with a plurality of line terminals, a plurality of electric valve means each associated with a different one of said terminals to control the number of turns of the associated winding which are connected in operative relation, said electric valve means each being provided with a control member for controlling the conductivity thereof, and means for rendering said electric valve means selectively conductive and nonconductive to control the voltage produced by said phase windings.

18. In combination, a constant current direct current circuit, an alternating current circuit, an inductive network connected between said circuits and comprising a plurality of phase windings each of which is provided with a plurality of line terminals, a plurality of electric valve means each associated with a different one of said terminals for controlling the operative portion of the associated phase winding, said electric valve means each being provided with a control member for controlling the conductivity thereof, means responsive to a predetermined controlling influence for rendering selectively conductive and nonconductive the electric valve means associated with predetermined terminals for variations of said influence within a predetermined range and for controlling the conductivities of said last mentioned electric valve means for variations of said influence within said range.

19. In combination, a constant current alternating current circuit, a second alternating current circuit, electric translating apparatus connected between said constant current circuit and said second circuit comprising a transformer including a plurality of windings electrically displaced in phase and each of which is provided with a plurality of terminals, electric valve means each associated with a different one of said terminals for controlling the portion of the associated winding operatively connected to control symmetrically said windings to effect transfer of power from said constant current-alternating current circuit to said second alternating current circuit, and means for controlling said electric valve means in response to an electrical condition of either said constant current circuit or said second circuit.

20. In combination, a constant current direct current circuit, an alternating current circuit, electric valve means connected between said circuits for transforming constant current direct current into alternating current of predetermined voltage and comprising transforming means including a plurality of windings electrically displaced in phase and each of which is provided with a plurality of terminals, electric valve means each associated with a different one of said terminals for controlling the portion of the associated winding operatively connected, and means for controlling said electric valve means to effect symmetrical control of the output voltage of said windings.

21. In combination, a constant voltage alternating current circuit, a constant current direct current circuit, a transformer having a winding provided with taps and being connected to said constant voltage circuit, an electric valve rectifier connected between said transformer and said direct current circuit, and tap-changing electric valve means associated with said taps for controlling the magnetic field of said transformer to transform constant voltage alternating current into alternating current of constant value so that said first mentioned electric valve means transmits a substantially constant direct current to said direct current circuit.

22. In combination, a constant voltage alternating current circuit, a direct current circuit, a transformer connected to said constant voltage circuit and including a winding provided with a plurality of taps, electric valve means connected between said transformer and said direct current circuit, tap-changing electric valve means for controlling said transformer, and means responsive to a predetermined electrical condition of said direct current circuit for controlling said tap-changing electric valve means.

23. In combination, a constant voltage alternating current circuit, a direct current circuit, a transformer having a winding provided with taps and being connected to said constant voltage circuit, electric valve means connected between said transformer and said direct current circuit for transforming alternating current into direct current, tap-changing electric valve means for controlling said transformer, and means responsive to the current of said direct current circuit for controlling said tap-changing electric-valve means.

24. In combination, a constant voltage alternating current circuit, a constant current direct current circuit, a transformer connected between said circuits comprising a winding having a plurality of line terminals, a plurality of electric valve means each associated with a different one of said terminals, and means for controlling said electric valve means to transmit a constant unidirectional current to said direct current circuit.

25. In combination, a constant voltage alternating current circuit, a constant current direct current circuit, a transformer connected between said circuits comprising a winding having a plurality of line terminals, a plurality of electric valve means each associated with a different one of said terminals, and means responsive to an electrical condition of said direct current circuit for controlling said electric valve means.

26. In combination, a constant current direct current circuit, an alternating current circuit, translating apparatus connected between said circuits and comprising a plurality of transformers each including a plurality of groups of polyphase windings, the corresponding phase windings of each group of any one transformer having the same phase relationship, and means for effecting selective energization of said primary windings to control the ampere-turns of the phases of said transformers to transfer power from said direct current circuit to said alternating current circuit at substantially constant voltage or vice versa and comprising electric valve means connected between said direct current circuit and said primary windings.

27. In combination, a direct current circuit, an alternating current circuit, translating apparatus connected between said circuits and comprising a plurality of transformers each including a plurality of groups of polyphase primary windings and having a secondary winding connected to said alternating current circuit, the corresponding phase windings of each group of any one transformer having the same phase relationship, electric valve means connected between said direct current circuit and said primary windings for transmitting alternating current thereto, and means for effecting selective energization of said primary windings in accordance with a predetermined electrical condition of said alternating current circuit to control the ampere-turns of the various phases of said transformers to effect transfer of power to said alternating current circuit at substantially constant voltage.

28. In combination, a constant current direct current circuit, an alternating current circuit, a transformer having a core member and a plurality of primary windings constituting a polyphase system, said primary windings having the same predetermined phase relationship with respect to the voltage of said alternating current circuit and said transformer including a secondary winding connected to said alternating current circuit, and a plurality of electric circuits each connected to said direct current circuit and a different one of said primary windings for controlling symmetrically the ampere-turns of each phase of said polyphase system and each comprising electric valve means for transforming direct current into alternating current.

29. In combination, a direct current circuit, an alternating current circuit, a transforming means comprising a plurality of primary windings and a secondary winding connected to said alternating current circuit, the number of turns of said primary windings constituting a progression to effect incremental or decremental variations in the primary ampere-turns not exceeding ten per cent of the total primary ampere-turns under variable load conditions, and a plurality of electric circuits each connected between said direct current circuit and a different one of said primary windings and each comprising means for transforming direct current into alternating current.

30. In combination, a direct current circuit, an alternating current circuit, a transforming means comprising a plurality of primary windings and a secondary winding connected to said alternating current circuit, the number of turns of said primary windings constituting a progression to effect incremental or decremental variations in the primary ampere-turns not exceeding ten per cent of the total primary ampere-turns under variable load conditions, a plurality of electric circuits each connected between said direct current circuit and a different one of said primary windings and each comprising means for transforming direct current into alternating current, and means for controlling said electric circuits for selectively energizing said primary windings.

31. In combination, a direct current circuit, an alternating current circuit, a transforming means comprising a plurality of primary windings and a secondary winding connected to said alternating current circuit, said primary windings being arranged to have different numbers of turns, a plurality of electric circuits each connected between said direct current circuit and a different one of said primary windings and each comprising means for transforming direct current into alternating current, and means responsive to a predetermined electrical condition of said alternating current circuit for controlling said electric circuits to effect selective energization of said primary windings.

32. In combination, a direct current circuit, an alternating current circuit, a transforming means comprising a plurality of primary windings and a secondary winding connected to said alternating current circuit, said primary windings being arranged to have different numbers of turns, a plurality of electric circuits each connected between said direct current circuit and a different one of said primary windings and each comprising means for transforming direct current into alternating current, and means responsive to the voltage of said alternating current circuit for effecting selective energization of said primary windings.

33. In combination, a direct current circuit, an alternating current circuit, a transforming means comprising a plurality of primary windings and a secondary winding connected to said alternating current circuit, said primary windings being arranged to have different numbers of turns, a plurality of electric circuits each connected between said direct current circuit and a different one of said primary windings and each comprising electric valve means for transforming direct current into alternating current, said electric valve means having direct current terminals connected in series relation with the electric valve means in the other electric circuits, and means for selectively shunting said direct current terminals to vary gradually the ampere-turns of said transforming means under varying load conditions.

34. In combination, a direct current circuit, an alternating current circuit, a transforming means comprising a plurality of primary windings and a secondary winding connected to said alternating current circuit, said primary windings being arranged to have different numbers of turns, a plurality of electric circuits each connected between said direct current circuit and a different one of said primary windings and each comprising electric valve means for transforming direct current into alternating current, said electric valve means each having direct current terminals connected in series relation with the electric valve means in the other electric circuits, and means for selectively shunting said direct current terminals to vary gradually the ampere-turns of said transforming means under varying load conditions to control an electrical condition of said alternating current circuit.

35. In combination, a direct current circuit, an alternating current circuit, a transforming means comprising a plurality of primary windings and a secondary winding connected to said alternating current circuit, said primary windings being arranged to have different numbers of turns, a plurality of electric circuits each connected between said direct current circuit and a different one of said primary windings and each comprising electric valve means for transforming direct current into alternating current, said electric valve means each having direct current terminals connected in series relation with the electric valve means in the other electric circuits, and means responsive to the voltage of the alternating current circuit for selectively shunting said direct current terminals to maintain the voltage of said alternating current circuit substantially constant.

36. In combination, a constant current direct current circuit, an alternating current direct, a transforming means comprising a plurality of primary windings and a secondary winding connected to said alternating current circuit, said primary windings being arranged to have different numbers of turns graded so that the variation in the primary ampere-turns under variable load conditions does not exceed ten per cent of the total primary ampere-turns thereby effecting gradual control of the magnetization of said transforming means, a plurality of electric circuits each connected between said direct current circuit and a different one of said primary windings and each comprising electric valve means for transforming direct current of constant value into alternating current of constant value, and means responsive to a predetermined electrical condition of one of said first mentioned circuits for controlling said electric circuits to effect selective energization of said primary windings.

37. In combination, a constant current direct current circuit, an alternating current circuit, a transforming means comprising a plurality of primary windings and a secondary winding connected to said alternating current circuit, said primary windings being arranged to have different numbers of turns, a plurality of electric circuits each connected between said direct current circuit and a different one of said primary windings and each comprising electric valve means for transforming direct current of constant value into alternating current of constant value, and means responsive to the voltage of said alternating current circuit for effecting selective energization of said primary windings.

38. In combination, a constant current direct current circuit, an alternating current circuit, a transforming means comprising a plurality of primary windings and having a secondary winding connected to said alternating current circuit, said primary windings being arranged to have different numbers of turns, a plurality of electric circuits for effecting energization of said primary windings from said direct current circuit and each comprising electric valve means for transforming direct current of constant value into alternating current of constant value, said electric valve means each having direct current terminals connected in series relation with the electric valve means in the other electric circuits, and means for selectively shunting said direct current terminals to vary gradually the ampere-turns of said transforming means under varying load conditions.

39. In combination, a constant current direct current circuit, an alternating current circuit, a transforming means comprising a plurality of primary windings and having a secondary winding connected to said alternating current circuit, said primary windings being arranged to have different numbers of turns, a plurality of electric circuits for effecting energization of said primary windings from said direct current circuit and each comprising electric valve means for transforming direct current of constant value into alternating current of constant value, said electric valve means each having direct current terminals connected in series relation with the electric valve means in the other electric circuits, and means for selectively shunting said direct current terminals to vary gradually the ampere-turns of said transforming means under varying load conditions thereby controlling an electrical condition of one of said first mentioned circuits.

40. In combination, a constant current direct current circuit, an alternating current circuit, a transforming means having a plurality of primary windings and having a secondary winding connected to said alternating current circuit, said primary windings being arranged to have different numbers of turns, a plurality of electric circuits for effecting energization of said primary windings from said direct current circuit and each comprising electric valve means for transforming direct current of constant value into alternating current of constant value, said electric valve means each having direct current terminals connected in series relation with the electric valve means in the other electric circuits, and means responsive to the voltage of said alternating current circuit for selectively shunting said direct current terminals to maintain the voltage of said alternating current circuit substantially constant.

41. In combination, an alternating current supply circuit, an alternating current load circuit, transforming means having a plurality of primary windings and a secondary winding connected to said load circuit, the number of turns of said primary windings being arranged in a geometric progression, and means for selectively connecting said primary windings to be energized from said supply circuit.

42. In combination, a constant current alternating current supply circuit, an alternating current load circuit, a transforming means connected between said circuits and comprising a plurality of primary windings and a secondary winding, the number of turns of said primary windings being arranged in a geometric progression, and means for selectively connecting said primary windings to said supply circuit to control an electrical condition of said load circuit.

43. In combination, a constant current circuit, an alternating current circuit, a transforming means connected between said circuits and comprising a plurality of primary windings and a secondary winding, the number of turns of said primary windings being arranged in a geometric progression, and means for selectively connecting said primary windings to said constant current circuit to control the resultant magnetic flux linking said secondary winding.

44. In combination, a transforming means having a plurality of primary windings and a secondary winding, the number of turns of said primary windings being arranged in a geometric progression, and means for selectively energizing said primary windings to control the voltage of said secondary winding.

45. In combination, a transforming means having a plurality of primary windings and a secondary winding, the number of turns of said primary windings being arranged in a geometric progression, and means for energizing said primary windings severally and in predetermined combinations to control the voltage of said secondary winding.

46. In a transformer, the combination of a core member and a plurality of primary windings and a secondary winding, the number of turns of said primary windings being arranged in a geometrical progression: $n$, $2n$, $4n$, $8n$, $16n$, etc. to control the resultant magnetic flux linking said secondary winding.

47. In a transformer, the combination of a core member, six primary windings and a secondary winding inductively associated, the number of turns of said primary windings being arranged in a geometric progression: $n$, $2n$, $4n$, $8n$, $16n$ and $32n$, and means for selectively energizing said primary windings to control the resultant magnetic field linking said secondary winding.

48. In combination, a transformer having a core member, a plurality of primary windings and a secondary winding, the number of turns of said primary windings being arranged in a geometrical progression: $n$, $2n$, $4n$, $8n$, $16n$, etc., to control the resultant magnetic flux linking said secondary winding, and means for selectively energizing said primary windings.

49. In a transforming means, the combination of five primary windings and a secondary winding, the number of turns of said primary windings being: $n$, $2n$, $4n$, $4n$ and $4n$ turns respectively, and means for controlling the energization of said primary windings to control the resultant magnetic field linking said secondary winding.

50. In combination, a direct current circuit, an alternating current circuit, a transforming means including five primary windings and a secondary winding connected to said alternating current circuit, said primary windings being arranged to have $n$, $2n$, $4n$, $4n$ and $4n$ turns respectively, and a plurality of electric circuits for selectively energizing said primary windings and each comprising electric valve means energized from said direct current circuit for transforming direct current into alternating current.

51. In combination, a direct current circuit, an alternating current circuit, a transforming means including five primary windings and a secondary winding connected to said alternating current circuit, said primary windings being arranged to have $n$, $2n$, $4n$, $4n$ and $4n$ turns respectively, a plurality of electric circuits for selectively energizing said primary windings and each comprising electric valve means energized from said direct current circuit for transforming direct current into alternating current, said electric valve means each having direct current terminals connected to said direct current circuit and being connected in series relation with the electric valve means in the other electric circuits, and means for controlling said electric valve means to effect selective energization of said primary windings.

52. In combination, a direct current circuit, an alternating current circuit, a transforming means including five primary windings and a secondary winding connected to said alternating current circuit, said primary windings being arranged to have $n$, $2n$, $4n$, $4n$ and $4n$ turns respectively, a plurality of electric circuits for selectively energizing said primary windings and each comprising electric valve means energized from said direct current circuit for transforming direct current into alternating current, said electric valve means each having direct current terminals connected to said direct current circuit and being connected in series relation with the electric valve means in the other electric circuits, and means for selectively shunting said direct current terminals to control the resultant magnetic field linking said secondary winding.

53. In combination, a constant voltage alternating current circuit, a constant current alternating current circuit, electric translating apparatus connected between said circuits for transforming power therebetween and comprising a transformer having a core member, a primary winding connected to said constant current circuit and a secondary winding connected to said constant voltage circuit, and means responsive to an electrical condition of said constant voltage alternating current circuit for controlling the reluctance of said core member to effect a constant current-constant voltage transformation of power between said constant current circuit and said constant voltage circuit.

54. In combination, a constant voltage alternating current circuit, a constant current alternating current circuit, a transformer having a core member, a primary winding connected to said constant voltage circuit and a secondary winding connected to said constant current circuit, and means for controlling the reluctance of said core member to maintain the magnetic field linking said secondary winding at a substantially constant value.

55. In combination, a constant voltage alternating current circuit, a constant current alternating current circuit, a transformer having a core member, a primary winding connected to said constant voltage circuit and a secondary winding connected to said constant current circuit, said transformer also being provided with a winding for controlling the magnetic field linking said secondary winding, and means for controlling said last mentioned winding.

56. In combination, a constant voltage alternating current circuit, a constant current alternating current circuit, a transformer having a core member, a primary winding connected to said constant voltage circuit and a secondary winding connected to said constant current circuit, said transformer also being provided with a winding for controlling the magnetic field linking said secondary winding, and means for controlling the current transmitted by said last mentioned winding.

57. In combination, a constant voltage alternating current circuit, a constant current alternating current circuit, a transformer having a core member, a primary winding connected to said constant voltage circuit, a secondary winding connected to said constant current circuit and a control winding, variable impedance means connected across terminals of said control winding, and means for controlling said variable impedance means in accordance with a predetermined controlling influence to maintain the magnetic field linking said secondary winding at a substantially constant value.

58. In combination, a constant current direct current circuit, a plurality of alternating current circuits, and a plurality of translating circuits each connected between said direct current circuit and a different one of said alternating current circuits and each comprising transforming means having windings provided with taps and tap-changing electric valve means for controlling said transformer to transform direct current of constant value into constant voltage alternating current.

59. In combination, a constant current direct current circuit, a plurality of alternating current circuits, and a plurality of translating circuits each connected between said direct current circuit and a different one of said alternating current circuits and each comprising a transformer having a plurality of primary windings of different numbers of turns and electric valve means for selectively energizing said primary windings to control gradually the magnetization of said transformer thereby controlling the voltage of the associated alternating current circuit under varying load conditions.

60. In combination, a constant current direct current circuit, a plurality of alternating current circuits, a plurality of translating circuits each connected between said direct current circuit and a different one of said alternating current circuits and each comprising a transformer having a plurality of primary windings having different numbers of turns and a plurality of electric valve converters connected between the direct current circuit and the primary windings for transforming direct current of constant value into alternating current of constant value, and means for controlling said electric valve converters to control gradually the ampere-turns of said transformer thereby to transform alternating current of constant value into constant voltage alternating current under varying load conditions.

61. In combination, a constant current direct current circuit, an alternating current circuit, electric valve means connected to said direct current circuit for transforming direct current of constant value into alternating current of constant value, a transformer connected between said electric valve means and said alternating current circuit, tap-changing electric valve means for controlling said transformer, and means for controlling said electric valve means to effect transformation of alternating current of constant value into alternating current of predetermined voltage.

62. In combination, an alternating current supply circuit, an alternating current load circuit, transforming means connected between said circuits and comprising a plurality of winding sections the number of turns of which are arranged in a geometric progression, and means for selectively connecting in operative relation said winding sections to one of said circuits to control an electrical condition of one of said circuits.

FRIEDRICH EICHBERG.

CERTIFICATE OF CORRECTION.

Patent No. 2,224,645.                    December 10, 1940.

FRIEDRICH EICHBERG.

It is hereby certified that error appears in the printed specification of the above numbered patent requiring correction as follows: Page 5, second column, line 24-25, for "substantialy" read --substantially--; page 14, first column, line 34, claim 36, for the word "direct" read --circuit--; and that the said Letters Patent should be read with this correction therein that the same may conform to the record of the case in the Patent Office.

Signed and sealed this 28th day of January, A. D. 1941.

(Seal)                                                      Henry Van Arsdale,
                                                           Acting Commissioner of Patents.